(12) United States Patent
Mantzel et al.

(10) Patent No.: US 11,176,694 B2
(45) Date of Patent: Nov. 16, 2021

(54) METHOD AND APPARATUS FOR ACTIVE DEPTH SENSING AND CALIBRATION METHOD THEREOF

(71) Applicant: Samsung Electronics Co., Ltd., Gyeonggi-do (KR)

(72) Inventors: William Mantzel, San Diego, CA (US); Dongwoon Bai, San Diego, CA (US); Jungwon Lee, San Diego, CA (US)

(73) Assignee: Samsung Electronics Co., Ltd

( * ) Notice: Subject to any disclaimer, the term of this patent is extended or adjusted under 35 U.S.C. 154(b) by 66 days.

(21) Appl. No.: 16/455,057

(22) Filed: Jun. 27, 2019

(65) Prior Publication Data

US 2020/0126246 A1 Apr. 23, 2020

Related U.S. Application Data

(60) Provisional application No. 62/748,023, filed on Oct. 19, 2018.

(51) Int. Cl.
*G06T 7/55* (2017.01)
*G02B 27/48* (2006.01)
*G01B 11/25* (2006.01)

(52) U.S. Cl.
CPC ............ *G06T 7/55* (2017.01); *G01B 11/2504* (2013.01); *G02B 27/48* (2013.01); *G06T 2207/10048* (2013.01)

(58) Field of Classification Search
CPC . G06T 7/55; G06T 2207/10048; G02B 27/48; G01B 11/2504
See application file for complete search history.

(56) References Cited

U.S. PATENT DOCUMENTS

| 6,285,959 | B1 | 9/2001 | Greer |
| 6,310,650 | B1 | 10/2001 | Johnson et al. |
| 8,681,224 | B2 | 3/2014 | Mallon et al. |
| 9,066,084 | B2 | 6/2015 | Zalevsky et al. |
| 9,329,263 | B2 | 5/2016 | Haynes et al. |
| 9,794,545 | B2 | 10/2017 | Bronstein et al. |
| 9,813,692 | B2 | 11/2017 | Zabatani et al. |
| 9,824,461 | B2 | 11/2017 | Bronstein et al. |
| 2015/0304617 | A1* | 10/2015 | Chang ............... H04N 13/254 348/189 |

(Continued)

FOREIGN PATENT DOCUMENTS

| EP | 2 701 387 | 2/2014 |
| WO | WO 2018/205036 | 11/2018 |

OTHER PUBLICATIONS

H. Yamazoe et al., "Easy depth sensor calibration", 2012, 21st International Conference on Pattern Recognition, p. 465-468. (Year: 2012).*

(Continued)

*Primary Examiner* — Brenda C Bernardi
(74) *Attorney, Agent, or Firm* — The Farrell Law Firm, P.C.

(57) ABSTRACT

A method and an electronic device are provided for recovering a depth map from an observed infrared (IR) image. Speckles are illuminated in an IR spectrum by a projector of the electronic device. Speckles on a horizon image are captured by an IR camera of the electronic device. Projector distortion is estimated based on speckle locations in the horizon image.

18 Claims, 6 Drawing Sheets

(56) References Cited

U.S. PATENT DOCUMENTS

| | | |
|---|---|---|
| 2016/0245641 A1 | 8/2016 | Kowdle et al. |
| 2017/0035268 A1* | 2/2017 | Kumar .................... G06T 15/80 |
| 2017/0256069 A1* | 9/2017 | Link ......................... G06T 7/55 |
| 2017/0278268 A1* | 9/2017 | Russell ................... G06T 7/579 |
| 2019/0033448 A1 | 1/2019 | Molnar et al. |

OTHER PUBLICATIONS

A. R. Orghidan et al., "Projector-camera calibration for 3D reconstruction using vanishing points", 2012, 2012 International Conference on 3D Imaging, p. 1-6. (Year: 2012).*

Raposo, Carolina et al., Fast and Accurate Calibration of a Kinect Sensor, 2013 International Conference on 3D Vision—3DV 2013, Seattle, WA, 2013, pp. 342-349.

Michael J. Landau et al., "Simulating Kinect Infrared and Depth Images", IEEE Transactions on Cybernetics, vol. 46, No. 12, Dec. 2016, 14 pages.

* cited by examiner

METHOD AND APPARATUS FOR ACTIVE DEPTH SENSING AND CALIBRATION METHOD THEREOF

PRIORITY

This application is based on and claims priority under 35 U.S.C. § 119(e) to a U.S. Provisional Patent Application filed on Oct. 19, 2018 in the United States Patent and Trademark Office and assigned Ser. No. 62/748,023, the contents of which are incorporated herein by reference.

FIELD

The present disclosure relates generally to a depth map estimation, and more particularly, to a method and an apparatus for calibrating an active depth sensing apparatus and performing active depth sensing.

BACKGROUND

Active depth sensing can improve on passive approaches (e.g., depth map estimation from stereo observations) by providing uniquely coded illuminations of the scene so that disparity between projector and observer (and thereby depth) can be estimated, even in homogenous or dimly lit regions. Such depth maps have been utilized in object and facial recognition, and may play a key role in augmented reality and scene reconstruction. Several iterations of active depth sensing devices have been developed, which utilize a projector that illuminates bright dots or speckles in the IR spectrum and are observed by a rigidly mounted infrared camera alongside the projector.

SUMMARY

According to one embodiment, a method is provided for recovering a depth map from an observed IR image using an active depth sensing device. Speckles are illuminated in an IR spectrum by a projector of the active depth sensing device. Speckles on a horizon image are captured by an IR camera of the active depth sensing device. Projector distortion is estimated based on speckle locations in the horizon image.

According to one embodiment, an electronic device is provided that includes a projector, an IR camera rigidly mounted with the projector, a processor, and a non-transitory computer readable storage medium storing instructions. When executed, the instructions cause the processor to illuminate speckles in an IR spectrum by the projector, capture, by the IR camera, speckles on a horizon image, and estimate projector distortion based on speckle locations in the horizon image.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate the existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as, "$1^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, such as, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

According to embodiments of the present disclosure, a method is provided for calibrating an active depth sensing device and recovering depth maps from observed IR images. An accurate calibration allows for better modeling of the observations, which in turn, allows for sub-pixel accuracy. Specifically, embodiments of the present disclosure provide the capability of computing accurate and complete depth maps on demand utilizing an active sensing framework, where the reflection of projected light is observed from a nearby IR camera whose image is used to infer depth.

Such a process may have an accuracy of 0.2% to 0.8% in the 0.5 meter (m) to 2 m range, and is computationally efficient being under a computation budget of 1 Gigaflop (Gflop)/frame for the full/image version, and 10 Megaflops (Mflops)/frame for the lightweight/video version. Further, such a process is capable of producing depth maps on demand from any vantage point between the projector and the IR camera, and in particular, from the vantage point of the standard RGB camera.

In order to calibrate a system, known (and usually flat) surfaces are used to estimate intrinsic parameters that best define the inner workings of the system. A parametric forward model is described in detail below, followed by a description of how to estimate the parameters used therein.

Herein, 3-D coordinates are referred to as $\vec{X}=(X, Y, Z)$, 2D image coordinates are referred to as $\vec{x}=(x, y)$ (typically in video graphics array (VGA) range: [0 640]×[0 480]), and 2D normalized image coordinates are referred to as $$\vec{x}_n = (x_n, y_n) = \left(\frac{X}{Z}, \frac{Y}{Z}\right),$$

or in some cases the homogenous coordinates $$\vec{x}_n = \left(\frac{X}{Z}, \frac{Y}{Z}, 1\right).$$

Triangle equalities ≜ are definitions.

Unless otherwise specified, all 3D coordinates have an origin at the optical center of the IR camera with a Z-axis coincident with the IR camera's optical axis, an X-axis pointing from the IR camera toward the projector (and presumed orthogonal to the Z-axis), and a Y-axis naturally completing the right-handed coordinate system. Any reference to distance means $\|\vec{X}\|$ while depth denotes the Z component of $\vec{X}$.

2-D image coordinate vectors are implicitly converted to 3-D homogenous coordinates when necessary: $\vec{p}=[p_x, p_y, 1]^T$. For example: $\vec{q}=H\vec{p}$ are set forth in Equation (1) as:

$$q_x = \frac{H_x \vec{p}}{H_z \vec{p}} \qquad (1)$$

$$q_y = \frac{H_y \vec{p}}{H_z \vec{p}}$$

for 3×3 homography H of the form set forth in Equation (2) as:

$$H = \begin{pmatrix} H_{x1} & H_{x2} & H_{x3} \\ H_{y1} & H_{y2} & H_{y3} \\ H_{z1} & H_{z2} & H_{z3} \end{pmatrix} \qquad (2)$$

The homogenous normalized coordinates $[x_n, y_n, 1]^T$ denote the direction from the camera to 3D point $\vec{X}$ and that $\vec{X}=Z\vec{x}_n$.

The image of the speckle pattern projected onto a surface of infinite depth is referred to as the horizon image (setting aside intensity attenuation effects). There is no parallax (induced disparity) between the projector and IR camera, and the horizon image would appear the same even if viewed from the vantage point of the projector.

All norms are standard Euclidean norms unless described otherwise. The p-norm ball with center x and radius r is written as $B_p(\vec{x}, r)$ and refers to the infinity norm when the subscript is omitted. For example, when referring to integer-valued coordinates $\vec{x}$, $\Sigma_{\vec{x} \in B(\vec{p},1)}(\dots)$ refers to a sum over the 4 neighboring pixels surrounding real-valued $\vec{p}$. Upper case variables usually denote either matrices or world coordinates, while lower case are more commonly used for image coordinates, subscripts, functions, etc. To prevent confusion between true and estimated quantities, the hat symbol to denote the latter, e.g., Î.

Figure 1:
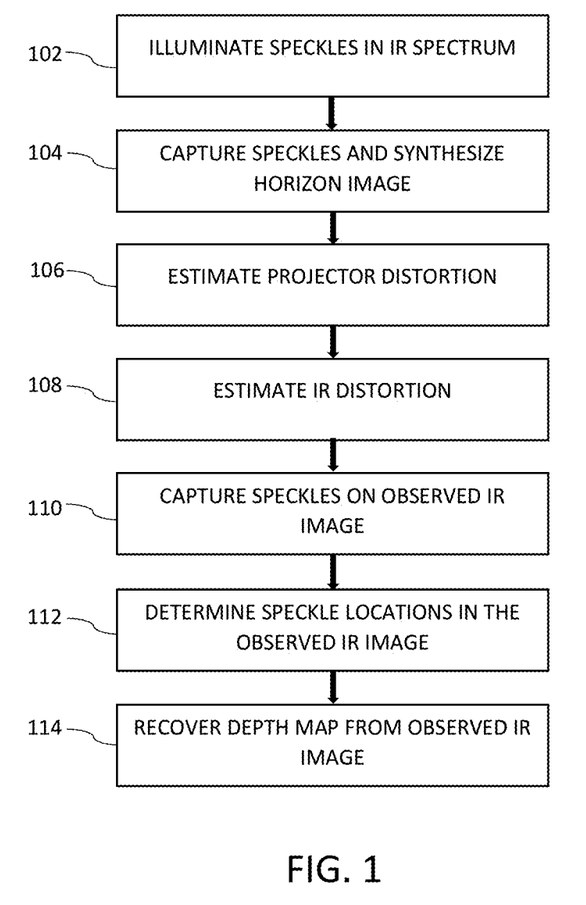
FIG. 1 is a flowchart illustrating a method of recovering a depth map from an observed IR image using an active depth sensing device, according to an embodiment of the present disclosure.

Referring initially to FIG. 1, a flowchart illustrates a method of recovering a depth map from an observed IR image using an active depth sensing device, according to an embodiment of the present disclosure. Speckles are illuminated in an IR spectrum by a projector of the active depth sensing device at 102. Speckles are captured by an IR camera rigidly mounted with the projector in the active depth sensing device, and a horizon image is synthesized at 104. Projector distortion is estimated based on speckle locations in the horizon image at 106. IR distortion is estimated in accordance with a focal length of the IR camera at 108. Speckles are captured on the observed IR image by the IR camera at 110. Speckle locations are determined in the observed IR image in accordance with the projector distortion and the IR distortion at 112. The depth map is recovered from the observed IR image based on the determined speckle locations at 114.

Figure 2:
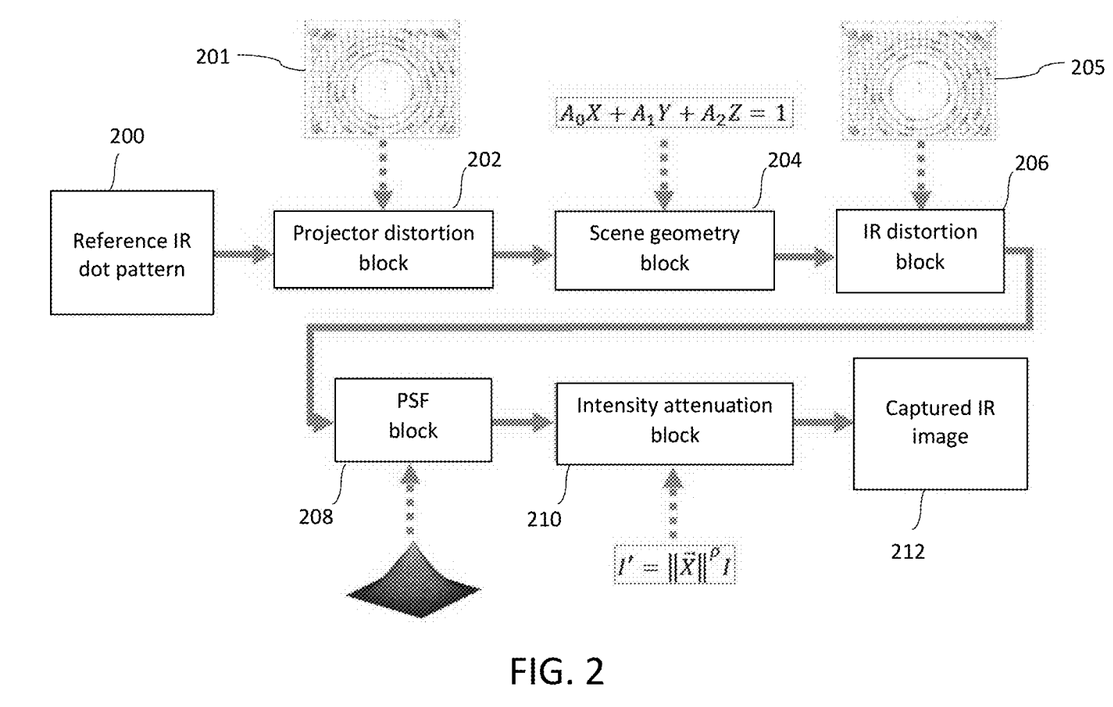
FIG. 2 is a diagram illustrating a forward model that can be used to infer depth from a given observation, according to one embodiment.

Referring now to FIG. 2, a diagram illustrates a forward model that can be used to infer depth from a given observation, according to an embodiment of the present disclosure. Specifically, the flowchart begins with photogrammetry, or how the pattern of speckles moves from the projector to the observed receiver in a given environment in the top row of FIG. 2, and then proceeds with photometry, or how these speckle locations manifest themselves on an observed image (the bottom row of FIG. 2).

In FIG. 2, a projector distortion block 202 first estimates projector distortion using a reference IR dot pattern 200 and an underlying projector pattern 201, resulting in a horizon image. A scene geometry block 204 applies the scene geometry. The scene geometry is the geometry of the scene the IR camera captures. For calibration, a known geometry, such as a planar surface, is used. An IR distortion block 206 estimates the IR distortion using an underlying projector pattern 205, making up the photogrammetry. A point spread function (PSF) block 208 applies the PSF, and an intensity attenuation block 210 takes into account intensity attenuation, resulting in a captured IR image 212, and making up the photometry.

In order to describe how each point in space maps to an image plane, a classic camera model is used. For a 3D point of interest $\vec{X}=(X, Y, Z)$ (e.g., the location of a speckle reflecting off a surface), the 2D pinhole projection coordinates are given as $$\vec{x}_n = (x_n, y_n) = \left(\frac{X}{Z}, \frac{Y}{Z}\right).$$

The relation between $\vec{x}_n$ and the actual image coordinates $\vec{x}$ are described below using this classic model. Taking into account the first few terms of lens distortion provides Equation (3) below:

$$\vec{x}_d = (1 + k_1 r^2 + k_2 r^4)\vec{x}_n + \begin{bmatrix} \kappa_3(2x_n y) + \kappa_4(r^2 + 2x_n^2) \\ \kappa_3(r^2 + 2y_n^2) + \kappa_4(2x_n y_n) \end{bmatrix} \quad (3)$$

where $r^2 = x_n^2 + y_n^2$, $\kappa_1$, $\kappa_2$ are radial distortion coefficients, and $K_3$, $K_4$ are the tangential distortion coefficients. The pixel coordinates are then given as Equation (4) below:

$$\vec{x}_n = K\vec{x}_d = \begin{bmatrix} f & 0 & c_x \\ 0 & f & c_y \\ 0 & 0 & 1 \end{bmatrix} \begin{bmatrix} x_d \\ y_d \\ 1 \end{bmatrix} \quad (4)$$

where f is the focal length of the camera in pixels, and ($c_x$, $c_y$) is the principal point. This calibration model can be generalized to a single polynomial in ($x_n$, $y_n$) as set forth in Equation (5) below:

$$\begin{bmatrix} x \\ y \end{bmatrix} = \sum_{i=0}^{5} \sum_{j=0}^{5} \vec{m}_{ij} x_n^i y_n^j \quad (5)$$

for some vector-valued coefficients $\vec{m}_{ij}$.

When much of the lens distortion has been removed in the IR image, $\vec{x}_d = \vec{x}_n$ is used and it is assumed that the principal point is the image center $\vec{c} = (c_x, c_y) = (320, 240)$, and the primary focus is on estimating the focal length accurately. Accordingly, the following simple calibration model is used as shown in Equation (6), where the focal length is the unknown in the model:

$$\vec{x} = K\vec{x}_n f\vec{x}_n + \vec{c} \quad (6)$$

With respect to the projector distortion block 202 of FIG. 2, an underlying pattern of a projector is a pseudo-random 180°-rotation-invariant binary pattern on a 211×165 grid, according to an embodiment of the present disclosure. The grid includes 3861 active speckles, meaning a laser shines in those corresponding directions from the projector, in roughly 1 out of 9 of the grid points. This pattern is itself repeated in a larger 3×3 grid structure. Each center speckle of the 9 repeated grids is active and shines brighter than the other pixels, but otherwise, each active speckle is of equal intensity.

If the locations of these speckles were observed on the horizon image, they would no longer be evenly spaced due to a distortion introduced by the projector. This distortion between the coordinates of the speckles in this pattern image $\vec{b}$ and the horizon image $\vec{p}$ is modeled as a polynomial in ($b_x$, $b_y$), in a manner similar to how the IR camera distortion was modeled above, as set forth in Equation (7) below:

$$\vec{p} = f_o(\vec{b}) \triangleq \sum_{i=0}^{5} \sum_{j=0}^{5} \vec{o}_{ij} b_x^i b_y^j \quad (7)$$

By the pinhole model, a baseline translation b in a vantage point along the x direction induces a corresponding shift in the apparent location of the object in normalized coordinates set forth in Equation (8) below:

$$\left(\frac{X+b}{Z}, \frac{Y}{Z}\right) = \vec{x}_n + \frac{b}{Z}\vec{e}_1. \quad (8)$$

The corresponding effect on pixel coordinates is a shift of magnitude fb/Z as shown in Equation (9) below:

$$K\left(\vec{x}_n + \frac{b}{Z}\vec{e}_1\right) = \vec{x} + \frac{fb}{Z}\vec{e}_1 = \vec{x} + d(\vec{x})\vec{e}_1 \qquad (9)$$

The disparity map $$d(\vec{x}) \triangleq \frac{C_0}{Z}$$

is defined with a focal-length baseline product: $C_0 \triangleq fb$, and with the canonical basis vector $e_1=(1,0)$. As set forth below, $e_1$ notation is dropped and $\vec{x}+d(\vec{x})$ is used as shorthand for $(x+d(\vec{x}), y)$ or more generally $\vec{x}+c \triangleq (x+c, y)$ for any $c \in \mathbb{R}$. When the induced displacement is measured in pixels between the observed dot pattern and the horizon dot pattern as the disparity map $d(\vec{x})$, the depth map can be recovered as $$Z(\vec{x}) = \frac{C_0}{d(\vec{x})}.$$

With respect to the application of PSF in the PSF block 208 of FIG. 2, rather than measure the speckle locations directly, the effect made on the IR image is observed. Due to the close proximity with other speckles (the nearest speckle is rarely much more than 2 pixels away), computing the speckle location as the center of mass proves problematic. Instead, a model of the PSF of the optics is used, modeling the observed image as set forth in Equation (10) below:

$$I(\vec{x}) = \sum_k h(\vec{x} - \vec{p}_k) \qquad (10)$$

for speckle locations $\vec{p}_k$ and point spread function $h(\vec{x})$. This PSF $h(\vec{x})$ is presumed to have local support, reaching its maximum at $\vec{x}=\vec{0}$ and rapidly decaying for $\|\vec{x}\|>2$ pixels.

With respect to the application of the intensity attenuation in the intensity attenuation block 210 of FIG. 2, the power intensity of light tends to disperse with greater distances. Accordingly, the measured intensity of the speckles in the IR camera decreases with greater distance and approximately follows some power law. Therefore, the model is updated as set forth in Equation (11) below:

$$I(\vec{x}) = D(\vec{x})^\alpha \sum_k h(\vec{x} - \vec{p}_k) \qquad (11)$$

where $D(\vec{x})$ denotes the distance to the speckle point in 3D space, measuring the full distance rather than merely the depth. Typically, $\alpha$ is some negative power close to −2.0 (as in the classic inverse-square power law).

Taking the composition of all functions described above yields the combined forward model as set forth in Equation (12) below:

$$I(\vec{x}) = E(\vec{x}) \sum_k h(\vec{x} - (\vec{o}_k + d(\vec{x}))) = E(\vec{x})I_h(\vec{x} - d(\vec{x})) \qquad (12)$$

$$I_h(\vec{x}) = \sum_k h(\vec{x} - \vec{o}_k)$$

$$I(\vec{x}) = D(\vec{x})^\alpha \sum_k h(\vec{x} - (f_o(\vec{b}_k) + d(\vec{x})))$$

Given the description of the forward model, an estimation of specific functions that govern the behavior of the model are set forth in detail below.

The focal length is proportional to the amount of shift that a given depth induces between horizon coordinates (disparity zero) and image coordinates. For this reason, given a-priori depth information $Z(\vec{x})$ and baseline b between the IR camera and the projector, a given focal length candidate f may be evaluated by attempting to shift the perspective of a pair of images $I_1(\vec{x})$, $I_2(\vec{x})$ to the horizon (that is, infinite depth/zero disparity) and observing the similarity via image correlation. The focal length estimate maximizes the similarity between the pair of images warped to the horizon using the focal length parameter, as set forth below in Equation (13):

$$f = \arg\max_f \langle I_1^{(f)} | I_2^{(f)} \rangle \qquad (13)$$

where the images $I_1$ and $I_2$ are warped to the horizon with candidate f, as set forth below in Equation (14):

$$I_j(\vec{x}) = I_j^{(f)}\left(\vec{x} - f\frac{b}{Z(\vec{x})}\right) \qquad (14)$$

Using depth map information, a focal length estimate of f=573 pixels±1% is determined. However, this estimate is only as accurate as the depth maps, and any systemic biases therein will result in corresponding biases in the focal length estimate.

With the intrinsic parameters of the IR camera being known as well as the underlying binary pattern described in FIG. 2, the projector distortion is estimated as a mapping between the binary-pattern pixel coordinates and the corresponding coordinates in the horizon image. However, it may be difficult to find a correspondence between the speckles on the binary pattern and those on a given image. The usual feature-matching methods break down when all of the feature points look more or less the same.

Another challenge is accurately estimating the coordinates of these speckle locations. Because of the aliasing and degradation inherent in the low-resolution VGA image, it is often difficult to determine where one speckle starts and the next one begins. Furthermore, as described above with respect to PSF, speckles that do not closely coincide with the integer lattice of the VGA sampling pattern often have very weak responses, making their locations difficult to reliably estimate.

To mitigate these challenges, a high-resolution version of the horizon image is constructed using a super-resolution approach. Using this high-resolution image, the challenges of tracking and correspondence become more manageable.

To this end, approximately 100 IR frames are captured with corresponding depth map information that can be used to estimate the high-resolution image. These images are captured with enough variation in depth to provide a diverse set of sub-pixel information in the x-direction due to parallax (though no additional information in the y direction). For this reason, the estimated horizon image has twice the resolution in the x direction but the same resolution in the y direction as the original VGA images.

Corresponding depth maps often have "holes", or missing values where a depth was not estimated. These holes are filled by interpolating the nearby values via Cauchy interpolation.

The high-resolution horizon image estimate is represented as Equation (15) below:

$$\hat{I}_h = \frac{\sum_n W_n^T I_n}{\sum_n W_n^T 1} \quad (15)$$

where 1 denotes the VGA image of all ones, the warp operators $W_n$ are defined as the bilinear warp that warps the high-resolution horizon image $I_h$ to the nth image $I_n$, and $W_n^T$ denotes the adjoint operation. For example, supposing the $n^{th}$ warp $W_n$ would cause the pixel $I_n(120,140)$ to be sampled from the horizon image at location (104.7,140) so that it is represented as 0.7 $I_h(104,140)$+0.3 $I_h(105,140)$, then the linear adjoint operation $W_n^T$ would cause the observed pixel $I_n(120,140)$ to be distributed or pushed to $I_h(104,140)$ and $I_h(105,140)$ with weights 0.7 and 0.3, respectively.

This method of providing estimate of $I_{horizon}$ is sufficiently accurate to assist downstream processing for quantities that are of intrinsic interest. A horizon image can be generated directly using the PSF and horizon speckle locations.

In accordance with the projector distortion block 202 of FIG. 2, with a high-resolution horizon image, the extrema become more obvious and there is much less ambiguity between speckles that now have twice the average spacing between them in the x direction. Any 3×3 neighborhood containing a speckle is likely to reach its maximum at one of the speckles' 4 neighbors, making it much easier to track predicted speckles.

Finding the approximate location in the horizon image corresponding to each active speckle in the binary pattern image $I_b$, moves toward estimating the distortion introduced by the projector and thereby a comprehensive list of the precise speckle locations in the horizon image.

The brightest center pixel in the horizon image is manually matched with the center pixel in the pattern image. Proceeding radially outward from there, the speckle locations in the small neighborhood bordering known speckles are iteratively predicted, a 3×3 neighborhood is searched to find the actual speckle locations (to the nearest integer pixel), and these tracked locations are used to update and improve predictions for speckles slightly further away.

This prediction is performed via a coarse warp grid, as set forth in Equation (16) below:

$$\widetilde{\vec{p}_k} = W(\vec{b}_k) \quad (16)$$

where W is a smooth warp function 48× coarser than the binary pattern that predicts speckle locations in the horizon image via bilinear interpolation of the 4 neighbors in the warp W. After tracking the new locations $\vec{p}_k$ by maximizing the horizon image within a patch of radius 1 surrounding $W(\vec{b}_k)$ (3×3 patch), the warp is updated with the newly tracked points by choosing the smoothest warp that best matches the observations, as set forth in Equation (17) below:

$$\arg\min_W \sum_k \|W(\vec{b}_k) - \vec{p}_k\|^2 + \lambda_1 \|D_x^2 W\|^2 + \lambda_2 \|D_y^2 W\|^2 + \lambda_3 \|D_x D_y W\|^2 \quad (17)$$

where $D_x$ and $D_y$ are the difference operators in the x and y direction (a convolutional kernel of [1 −1]), respectively.

The regularization of derivatives and mixed derivatives ensure smoothness. The first derivatives are allowed to be large as long as local changes in derivatives are not too sudden in any direction. In this way, the warp in each iteration can be extrapolated as the region of confidence grows. This procedure is depicted in FIG. 3 at iterations 10, 20 and 40, where the search region grows in proportion to the iteration number.

Figure 3:
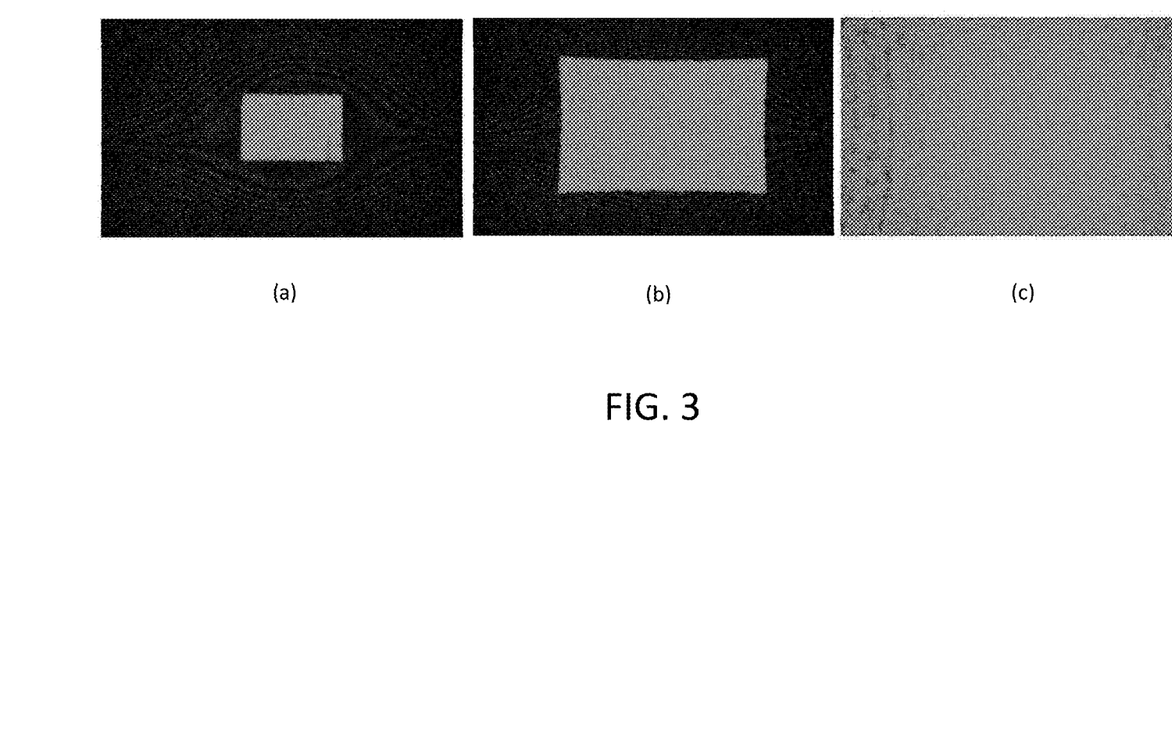
FIG. 3 is a diagram illustrating speckle locations that are iteratively predicted and tracked over ever-growing regions of confident matches, according to one embodiment.

FIG. 3 is a diagram illustrating speckles locations that are iteratively predicted and tracked over ever-growing regions of confident matches, according to an embodiment of the present disclosure. Specifically, FIG. 3 shows 10 iterations (a), 20 iterations (b) and 40 iterations (c). Inliers are tracked speckles that match predicted locations to within 1 pixel, and are shown in the shaded regions. The remaining darker regions show outliers having tracked speckles at least 1 pixel away from predicted locations.

Given this non-parametric warping function $W: \mathbb{R}^2 \rightarrow \mathbb{R}^2$, the closest polynomial approximation to $f_0$ can be found as shown below in Equation (18):

$$W(\vec{b}) \simeq f_o(\vec{b}) \triangleq \sum_{i=0}^{5} \sum_{j=0}^{5} \vec{o}_{ij} b_x^i b_y^j \quad (18)$$

The warp grid W may be used as data constraints to use robust least squares to estimate the generating coefficients $\vec{o}_{ij}$. $5^{th}$ order polynomial gives sufficiently strong modeling power.

With respect to the PSF block 208 of FIG. 2, with an estimate for the focal length f, and horizon point locations $\vec{p}_k$, the point spread function h can be estimated. Using the focal length and depth map to construct the disparity map d, inverting this to the perspective of the projector $d_{Proj}$, and using the speckle locations of the horizon image $\vec{p}_k$, the speckle locations in the observed image $\vec{q}_k$ can be predicted as set forth in Equation (19) below:

$$\vec{q}_k = \vec{p}_k + d_{Proj}(\vec{p}_k k) \quad (19)$$

Figure 4:
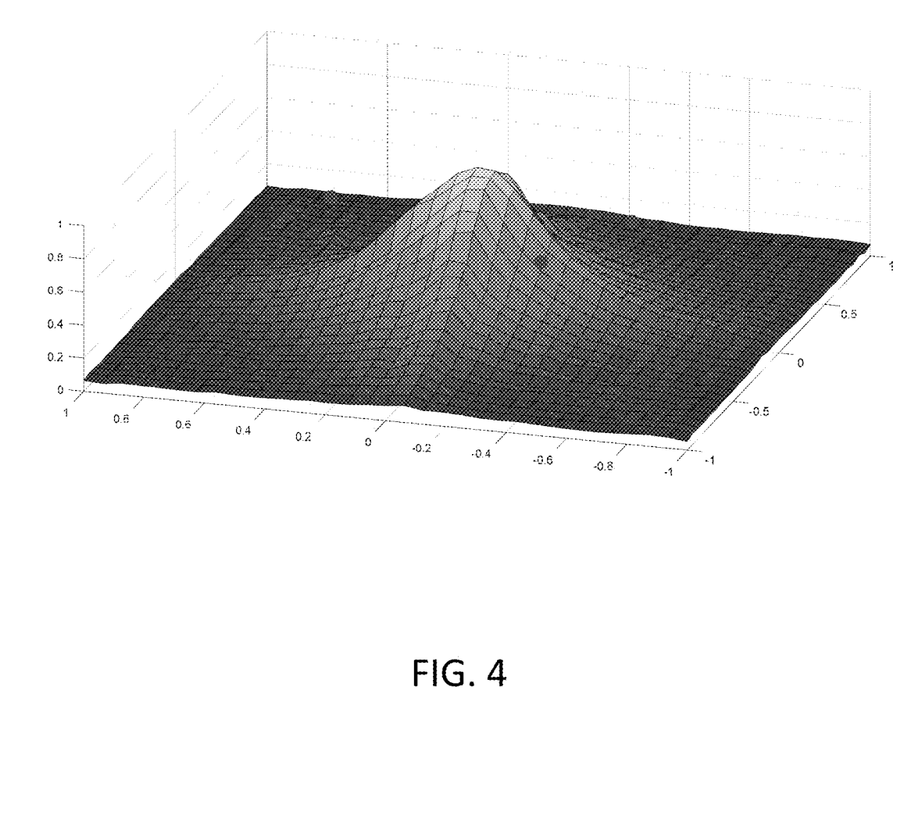
FIG. 4 is a diagram illustrating the point spread function estimate with relevant samples, according to one embodiment.

FIG. 4 is a diagram illustrating the point spread function estimate with relevant samples, according to an embodiment of the present disclosure. Each of the 4 pixels surrounding the location $\vec{q}_k$ provide 4 data constraints for the point spread function h. The relevant samples are $\vec{q}_k - \vec{u}$, where $\vec{u} \in B_\infty(\vec{q}_k, 1)$ (i.e., the 4 grid points surrounding $\vec{q}_k$). Taken together, the approximately 20,000 visible speckles provide approximately 80,000 constraints on h on the domain [−1 1]×[−1 1]. A finely sampled version of h with $\frac{1}{16}^{th}$ pixel between samples (16× higher resolution than VGA) using the following regularized least squares, similar to that described above to estimate the non-parametric warp grid, is shown below in Equation (20):

$$\arg\min_{h} \sum_{k} \sum_{\vec{u} \in B_\infty(\vec{q}_k, 1)} (I(\vec{u}) - h(\vec{q}_k - \vec{u}))^2 + \lambda_1 \|D_x^2 h\|^2 + \lambda_2 \|D_y^2 h\|^2 + \lambda_3 \|D_x D_y h\|^2 \quad (20)$$

where $D_x$ and $D_y$ are the difference operators in the x and y direction respectively, where the minimization is taken over the sampled $h \in \mathbb{R}^{33^2}$, and where $h(\vec{q}_k - \vec{u})$ is shorthand for the bilinear interpolation of sampled h at the point $\vec{q}_k - \vec{u}$.

The forward model may be used to solve the inverse problem: recovering the depth map from the IR observation of an unknown scene.

The forward model is utilized to construct a horizon image $I_h$ to match against. Then the disparity map is estimated, as set forth in Equation (21) below:

$$d(\vec{x}) = \arg\max_{\vec{d}} \langle \lfloor I \rfloor_{\vec{x}}, \lfloor I_h \rfloor_{\vec{x}-\vec{d}} \rangle_N = \arg\min_{\vec{d},\alpha} \|\lfloor I \rfloor_{\vec{x}} - \alpha \lfloor I_h \rfloor_{\vec{x}-\vec{d}}\| \quad (21)$$

where $\lfloor I \rfloor_{\vec{x}}$ is a patch drawn from image I centered at coordinate $\vec{x}$ (e.g., a 17×17 patch at that location) and where $$\langle x | y \rangle_N = \frac{\langle x | y \rangle}{\|x\| \|y\|}.$$

To evaluate D potential disparities at V locations (e.g., VGA) using a patch size of P results in O (DVP) flops, which can easily surpass a Gflop. There are ways to reduce the computational complexity of this approach by using integral images to compute the D correlations, eliminating the P factor to yield O(DV).

Unless the true disparity is close to some integer, it is possible that none of the candidate $\lfloor I_h \rfloor_{\vec{x}-\vec{d}}$ shifts match very well due to the localized nature of the point spread function. This problem can be alleviated by sampling $\vec{d}$ with more granularity (e.g., quarter-pixel shifts). However, this approach may exacerbate the computational bottleneck.

As described in detail below, an approach is set forth to provide an initial estimate of the disparity map at low-resolution among integer disparities, but with some built-in robustness against non-integer-shift mismatch to mitigate the above-described problem.

This approach first defines, for each sampled reference location $\vec{x}$ in the horizon image, a subspace $\mathbb{S}_{\vec{x}}$ that well-approximates all of the potential patches that might be observed in the IR image (in any shift along that row) that are similar to $\lfloor I_h \rfloor_{\vec{x}}$. In order to estimate the disparity at this location, for every candidate integer disparity d, the distance between $\lfloor I \rfloor_{\vec{x}+\vec{d}}$ and its closest approximation in the subspace T is minimized, as set forth below in Equation (22):

$$d_{Proj}(\vec{x}) = \arg\min_{d} \min_{T \in \mathbb{S}_{\vec{x}}} \|\lfloor I \rfloor_{\vec{x}+d} - T\|^2 \quad (22)$$

One way to design such a subspace is to define a random variable $R_{\vec{x}}$ that describes the natural space of patches similar to $\lfloor I_h \rfloor_{\vec{x}}$ (i.e., corresponding to some modeled space of "real scenes") and then minimize its approximation error with respect to some projection matrix $P_{\vec{x}}$, as set forth below in Equation (23):

$$\arg\min_{P_{\vec{x}}} \mathbb{E}[\|R_{\vec{x}} - P_{\vec{x}} R_{\vec{x}}\|^2] = \arg\max_{P_{\vec{x}}} \mathbb{E}[\|P_{\vec{x}} R_{\vec{x}}\|^2] = \arg\max_{P_{\vec{x}}} \langle P_{\vec{x}} | Q_{\vec{x}} \rangle \quad (23)$$

where $Q_{\vec{x}}$ is the correlation matrix of random variable $R_{\vec{x}}$ and the optimization is taken over all projection matrices $P_{\vec{x}}$. This is the standard principal components analysis (PCA) solution. It remains to define $R_{\vec{x}}$. One natural design is to take $R_{\vec{x}} = \lfloor I_h \rfloor_{\vec{x}+\vec{\epsilon}}$ where g is some zero-mean random shift with variance typically less than a pixel$^2$ in both x and y directions. An 8-dimensional subspace often gives sufficient descriptive power to this random variable, and helps to improve robustness to modeling/calibration inaccuracy in this initial tracking step. The final procedure is then set forth in Equation (24) below:

$$d_{Proj}(\vec{x}) = \arg\min_{\vec{d}} \|\lfloor I \rfloor_{\vec{x}+d} - P_{\vec{x}} \lfloor I \rfloor_{\vec{x}+d}\|^2 = \arg\max_{\vec{d}} \|P_{\vec{x}} \lfloor I \rfloor_{\vec{x}+d}\|^2 \quad (24)$$

There are several aspects that demand immediate improvement on this initial estimate. It is low-resolution, integer-valued, contains occasional bad disparity estimates (i.e., far from their true values), and is taken from the vantage point of the projector rather than IR camera.

The problem of "bad" disparity values is addressed by penalizing an assigned disparity value by the L1 distance to its neighbors as set forth below in Equation (25):

$$d_{Proj}(\vec{x}) = \arg\min_{d} \|\lfloor I \rfloor_{\vec{x}+d} - P_{\vec{x}} \lfloor I \rfloor_{\vec{x}+d}\|^2 + \lambda \sum_{\vec{u} \in B(\vec{x},1)} |d - d_{Proj}(\vec{u})| \quad (25)$$

Figures 5A, 5B, 5C, 5D:
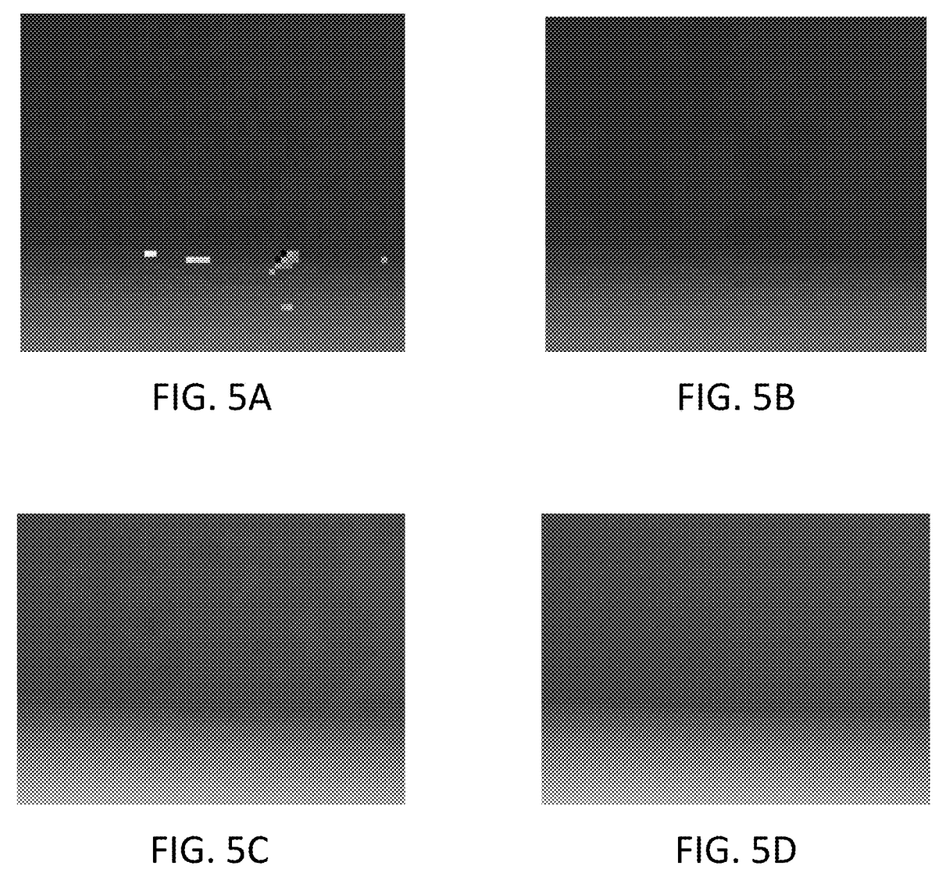
FIGS. 5A-5D are diagrams illustrating an initial estimate, an estimate cleaned via median regularization, and a disparity map refined via sub-pixel matching, according to one embodiment.

FIGS. 5A and 5B are diagrams illustrating an initial estimate and an estimate cleaned via median regularization, according to an embodiment of the present disclosure. This cannot be solved directly, but is instead iterated over increasing lambda parameters via exhaustive search where λ=0 for the first iteration and the $d_{Proj}(\vec{u})$ samples are drawn from the previous iteration. Note in particular that λ=0 is the unregularized formulation above and that λ→∞ yields the median filter of the initial estimate.

Next, low-resolution $d_{Proj}(\vec{x})$ is converted to VGA-resolution $d(\vec{x})$ while simultaneously changing the vantage point from the projector to the IR camera.

This coarse estimate is refined as set forth below in Equation (26):

$$d(\vec{x}) = \arg\max_{d} \langle \lfloor I \rfloor_{\vec{x}}, \lfloor I_h \rfloor_{\vec{x}-\vec{d}} \rangle_N \quad (26)$$

FIGS. 5C and 5D are diagrams illustrating a cleaned disparity map and a disparity map refined via sub-pixel matching, according to an embodiment of the present disclosure. The maximization takes place with d sampled at a quarter pixel resolution and within 1 pixel of the existing coarse $d(\vec{x})$ estimate.

Although model-based tracking offers some potential advantages, it comes with risks as well, and the resulting disparity map estimation will only be as good as the estimated underlying model.

One alternative is to remain agnostic to the precise speckle locations and use the observed image from a flat surface reasonably far away (e.g., 2 meters) as a proxy for the horizon image $I_h$ and then proceed with the NCC-based estimation as in Equation (21). The advantages of this approach are that it is likely to be quite accurate in regions near the reference depth and also gets the horizon point location+point spread function rendering correct due to being an observation itself. A downside is that such a reference image $I_h$ is primarily accurate for approximately-integer disparities, and may suffer from modeling accuracy in between the grid points. Another downside is that this reference image remains blind to what lies beyond the boundaries of the observed VGA image, and may not be useful in generating depth map information near the left and right edges of observed images whose depths differ from the reference depth.

Figure 6:
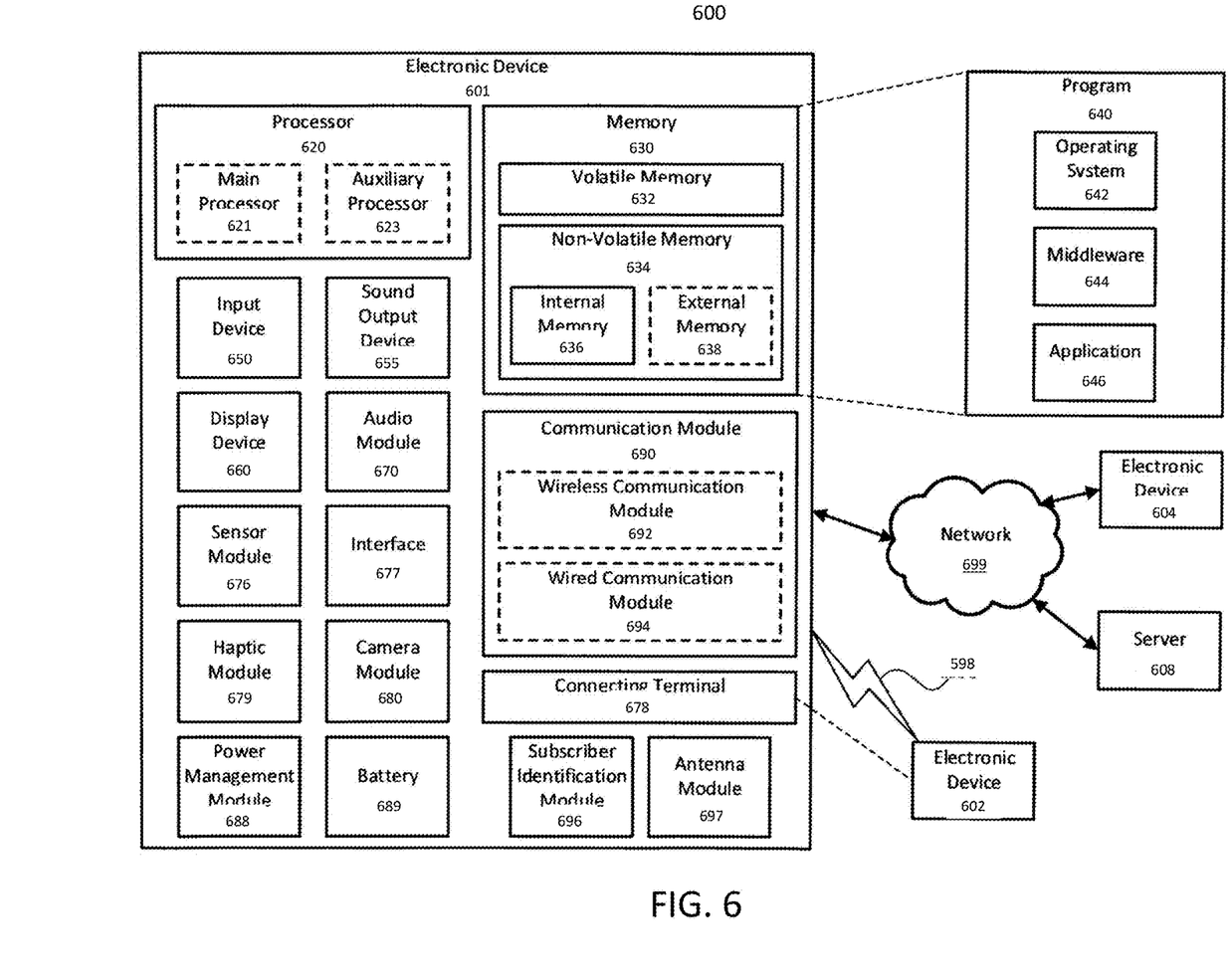
FIG. 6 is a diagram illustrating an electronic device in a network environment, according to one embodiment.

FIG. 6 is a block diagram of an electronic device in a network environment, according to one embodiment.

Referring to FIG. 6, an electronic device 601 in a network environment 600 may communicate with an electronic device 602 via a first network 698 (e.g., a short-range wireless communication network), or an electronic device 604 or a server 608 via a second network 699 (e.g., a long-range wireless communication network). The electronic device 601 may communicate with the electronic device 604 via the server 608. The electronic device 601 may include a processor 620, a memory 630, an input device 650, a sound output device 655, a display device 660, an audio module 670, a sensor module 676, an interface 677, a haptic module 679, a camera module 680, a power management module 688, a battery 689, a communication module 690, a subscriber identification module (SIM) 696, or an antenna module 697. In one embodiment, at least one (e.g., the display device 660 or the camera module 680) of the components may be omitted from the electronic device 601, or one or more other components may be added to the electronic device 601. In one embodiment, some of the components may be implemented as a single integrated circuit (IC). For example, the sensor module 676 (e.g., a fingerprint sensor, an iris sensor, or an illuminance sensor) may be embedded in the display device 660 (e.g., a display).

The processor 620 may execute, for example, software (e.g., a program 640) to control at least one other component (e.g., a hardware or a software component) of the electronic device 601 coupled with the processor 620, and may perform various data processing or computations. As at least part of the data processing or computations, the processor 620 may load a command or data received from another component (e.g., the sensor module 676 or the communication module 690) in volatile memory 632, process the command or the data stored in the volatile memory 632, and store resulting data in non-volatile memory 634. The processor 620 may include a main processor 621 (e.g., a central processing unit (CPU) or an application processor (AP)), and an auxiliary processor 623 (e.g., a graphics processing unit (GPU), an image signal processor (ISP), a sensor hub processor, or a communication processor (CP)) that is operable independently from, or in conjunction with, the main processor 621. Additionally or alternatively, the auxiliary processor 623 may be adapted to consume less power than the main processor 621, or execute a particular function. The auxiliary processor 623 may be implemented as being separate from, or a part of, the main processor 621.

The auxiliary processor 623 may control at least some of the functions or states related to at least one component (e.g., the display device 660, the sensor module 676, or the communication module 690) among the components of the electronic device 601, instead of the main processor 621 while the main processor 621 is in an inactive (e.g., sleep) state, or together with the main processor 621 while the main processor 621 is in an active state (e.g., executing an application). According to one embodiment, the auxiliary processor 623 (e.g., an image signal processor or a communication processor) may be implemented as part of another component (e.g., the camera module 680 or the communication module 690) functionally related to the auxiliary processor 623.

The memory 630 may store various data used by at least one component (e.g., the processor 620 or the sensor module 676) of the electronic device 601. The various data may include, for example, software (e.g., the program 640) and input data or output data for a command related thereto. The memory 630 may include the volatile memory 632 or the non-volatile memory 634.

The program 640 may be stored in the memory 630 as software, and may include, for example, an operating system (OS) 642, middleware 644, or an application 646.

The input device 650 may receive a command or data to be used by other component (e.g., the processor 620) of the electronic device 601, from the outside (e.g., a user) of the electronic device 601. The input device 650 may include, for example, a microphone, a mouse, or a keyboard.

The sound output device 655 may output sound signals to the outside of the electronic device 601. The sound output device 655 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 660 may visually provide information to the outside (e.g., a user) of the electronic device 601. The display device 660 may include, for example, a display, a hologram device, or a projector and control circuitry to control a corresponding one of the display, hologram device, and projector. According to one embodiment, the display device 660 may include touch circuitry adapted to detect a touch, or sensor circuitry (e.g., a pressure sensor) adapted to measure the intensity of force incurred by the touch.

The audio module 670 may convert a sound into an electrical signal and vice versa. According to one embodiment, the audio module 670 may obtain the sound via the input device 650, or output the sound via the sound output device 555 or a headphone of an external electronic device 602 directly (e.g., wired) or wirelessly coupled with the electronic device 601.

The sensor module 676 may detect an operational state (e.g., power or temperature) of the electronic device 601 or an environmental state (e.g., a state of a user) external to the electronic device 601, and then generate an electrical signal or data value corresponding to the detected state. The sensor module 676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 677 may support one or more specified protocols to be used for the electronic device 601 to be coupled with the external electronic device 602 directly (e.g., wired) or wirelessly. According to one embodiment, the interface 677 may include, for example, a high definition multimedia interface (HDMI), a universal serial bus (USB) interface, a secure digital (SD) card interface, or an audio interface.

A connecting terminal 678 may include a connector via which the electronic device 601 may be physically connected with the external electronic device 602. According to one embodiment, the connecting terminal 578 may include, for example, an HDMI connector, a USB connector, an SD card connector, or an audio connector (e.g., a headphone connector).

The haptic module 679 may convert an electrical signal into a mechanical stimulus (e.g., a vibration or a movement) or an electrical stimulus which may be recognized by a user via tactile sensation or kinesthetic sensation. According to one embodiment, the haptic module 679 may include, for example, a motor, a piezoelectric element, or an electrical stimulator.

The camera module 680 may capture a still image or moving images. According to one embodiment, the camera module 680 may include one or more lenses, image sensors, image signal processors, or flashes.

The power management module 688 may manage power supplied to the electronic device 601. The power management module 688 may be implemented as at least part of, for example, a power management integrated circuit (PMIC).

The battery 689 may supply power to at least one component of the electronic device 601. According to one embodiment, the battery 689 may include, for example, a primary cell which is not rechargeable, a secondary cell which is rechargeable, or a fuel cell.

The communication module 690 may support establishing a direct (e.g., wired) communication channel or a wireless communication channel between the electronic device 601 and the external electronic device (e.g., the electronic device 602, the electronic device 604, or the server 608) and performing communication via the established communication channel. The communication module 690 may include one or more communication processors that are operable independently from the processor 620 (e.g., the AP) and supports a direct (e.g., wired) communication or a wireless communication. According to one embodiment, the communication module 690 may include a wireless communication module 692 (e.g., a cellular communication module, a short-range wireless communication module, or a global navigation satellite system (GNSS) communication module) or a wired communication module 694 (e.g., a local area network (LAN) communication module or a power line communication (PLC) module). A corresponding one of these communication modules may communicate with the external electronic device via the first network 698 (e.g., a short-range communication network, such as Bluetooth™, wireless-fidelity (Wi-Fi) direct, or a standard of the Infrared Data Association (IrDA)) or the second network 699 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 692 may identify and authenticate the electronic device 601 in a communication network, such as the first network 698 or the second network 699, using subscriber information (e.g., international mobile subscriber identity (IMSI)) stored in the subscriber identification module 596.

The antenna module 697 may transmit or receive a signal or power to or from the outside (e.g., the external electronic device) of the electronic device 501. According to one embodiment, the antenna module 697 may include one or more antennas, and, therefrom, at least one antenna appropriate for a communication scheme used in the communication network, such as the first network 698 or the second network 699, may be selected, for example, by the communication module 690 (e.g., the wireless communication module 692). The signal or the power may then be transmitted or received between the communication module 690 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 601 and the external electronic device 604 via the server 608 coupled with the second network 699. Each of the electronic devices 602 and 604 may be a device of a same type as, or a different type, from the electronic device 601. All or some of operations to be executed at the electronic device 601 may be executed at one or more of the external electronic devices 602, 604, or 608. For example, if the electronic device 601 should perform a function or a service automatically, or in response to a request from a user or another device, the electronic device 601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 601. The electronic device 601 may provide the outcome, with or without further processing of the outcome, as at least part of a reply to the request. To that end, a cloud computing, distributed computing, or client-server computing technology may be used, for example.

One embodiment may be implemented as software (e.g., the program 640) including one or more instructions that are stored in a storage medium (e.g., internal memory 636 or external memory 638) that is readable by a machine (e.g., the electronic device 601). For example, a processor of the electronic device 601 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method of recovering a depth map from an observed infrared (IR) image using an active depth sensing device, the method comprising:
   illuminating speckles in an IR spectrum by a projector of the active depth sensing device;
   capturing speckles and synthesizing a horizon image, by an IR camera of the active depth sensing device, wherein the horizon image comprises a speckle pattern estimated by warping a plurality of images of varying depth, each of the plurality of images having a diverse set of pixel information in an x-direction from the IR camera to the projector, and the horizon image having a higher resolution in the x-direction than each of the plurality of images; and
   estimating projector distortion based on speckle locations in the horizon image.

2. The method of claim 1, wherein the IR camera is rigidly mounted with the projector in the active sensing device.

3. The method of claim 1, wherein the projector distortion corresponds to a mapping between speckle coordinates of a binary pattern image and corresponding speckle coordinates of the horizon image.

4. The method of claim 3, wherein the horizon image comprises a high resolution horizon image, and estimating the projector distortion comprises matching a brightest center speckle in the horizon image with a center speckle in the binary pattern image, and iteratively predicting speckle locations in the horizon image in areas bordering known speckles.

5. The method of claim 1, further comprising:
   estimating IR distortion in accordance with a focal length of the IR camera;
   capturing, by the IR camera, speckles on the observed IR image;
   determining speckle locations in the observed IR image in accordance with the projector distortion and the IR distortion; and
   recovering the depth map from the observed IR image based on the determined speckle locations.

6. The method of claim 5, wherein at least one of:
   the focal length is proportional to an amount of shift a given depth induces between coordinates of the horizon image and coordinates of the observed IR image; and
   the focal length maximizes a similarity between a pair of images warped to the horizon image using a focal length parameter.

7. The method of claim 5, wherein determining speckle locations in the observed IR image comprises:
   constructing a disparity map using the focal length;
   inverting the disparity map to a perspective of the projector; and
   predicting the speckle locations in the observed IR image using the speckle locations in the horizon image and the inverted disparity map.

8. The method of claim 7, wherein constructing the disparity map comprises:
   obtaining an initial disparity map;
   cleaning the initial disparity map via median regularization; and
   refining the cleaned disparity map via sub-pixel matching.

9. The method of claim 5, wherein determining speckle locations in the observed IR image comprises:
   modifying the speckle locations in the observed IR image in accordance with an intensity attenuation.

10. The method of claim 9, wherein the intensity attenuation comprises a measured decrease in intensity of speckles in the IR camera as a distance from the IR camera to the speckles increases.

11. An electronic device, comprising:
    a projector;
    an infrared (IR) camera rigidly mounted with the projector;
    a processor; and
    a non-transitory computer readable storage medium storing instructions that, when executed, cause the processor to:
       illuminate speckles in an IR spectrum by the projector;
       capture, by the IR camera, speckles and synthesize a horizon image, wherein the horizon image comprises a speckle pattern estimated by warping a plurality of images of varying depth, the plurality of images having a diverse set of pixel information in an x-direction from the IR camera to the projector, and the horizon image having a higher resolution in the x-direction than each of the plurality of images; and
       estimate projector distortion based on speckle locations in the horizon image.

12. The electronic device of claim 11, wherein the projector distortion corresponds to a mapping between speckle coordinates of a binary pattern image and corresponding speckle coordinates of the horizon image.

13. The electronic device of claim 12, wherein the horizon image comprises a high resolution horizon image, and estimating the projector distortion comprises matching a brightest center speckle in the horizon image with a center speckle in the binary pattern image, and iteratively predicting speckle locations in the horizon image in areas bordering known speckles.

14. The electronic device of claim 11, wherein the non-transitory computer readable storage medium stores instructions that, when executed, further cause the processor to:
   estimate IR distortion in accordance with a focal length of the IR camera;
   capture, by the IR camera, speckles on the observed IR image;
   determine speckle locations in the observed IR image in accordance with the projector distortion and the IR distortion; and
   recover the depth map from the observed IR image based on the determined speckle locations.

15. The electronic device of claim 14, wherein at least one of:
   the focal length is proportional to an amount of shift a given depth induces between coordinates of the horizon image and coordinates of the observed IR image; and
   the focal length maximizes a similarity between a pair of images warped to the horizon image using a focal length parameter.

16. The electronic device of claim 14, wherein, in determining speckle locations in the observed IR image, the instructions further cause the processor to:
   construct a disparity map using the focal length;
   invert the disparity map to a perspective of the projector; and
   predict the speckle locations in the observed IR image using the speckle locations in the horizon image and the inverted disparity map.

17. The electronic device of claim 14, wherein, in constructing the disparity map, the instructions further cause the processor to:
   obtain an initial disparity map;
   clean the initial disparity map via median regularization; and
   refine the cleaned disparity map via sub-pixel matching.

18. The electronic device of claim 14, wherein determining speckle locations in the observed IR image comprises:
   modifying the speckle locations in the observed IR image in accordance with an intensity attenuation comprising a measured decrease in intensity of speckles in the IR camera as a distance from the IR camera to the speckles increases.

* * * * *